(12) United States Patent
Deeds (10) Patent No.: US 7,200,388 B2
(45) Date of Patent: Apr. 3, 2007

(54) FRAGMENTED DELIVERY OF MULTIMEDIA

(75) Inventor: Douglas Deeds, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 683 days.

(21) Appl. No.: 10/160,364

(22) Filed: May 31, 2002

(65) Prior Publication Data

US 2003/0224773 A1 Dec. 4, 2003

(51) Int. Cl.
*H04M 3/00* (2006.01)
*H06F 15/00* (2006.01)

(52) U.S. Cl. ............... 455/419; 455/418; 455/420; 380/283; 380/255; 380/258; 715/500; 715/500.1

(58) Field of Classification Search ........... 455/466, 455/418, 414.1, 567; 370/487, 535; 379/101.01; 709/217, 203, 236, 232, 250
See application file for complete search history.

(56) References Cited

U.S. PATENT DOCUMENTS

| | | | |
|---|---|---|---|
| 5,822,700 A * | 10/1998 | Hult et al. ................. | 455/466 |
| 6,018,654 A * | 1/2000 | Valentine et al. ......... | 455/414.4 |
| 6,247,130 B1 * | 6/2001 | Fritsch ....................... | 713/171 |
| 6,363,357 B1 * | 3/2002 | Rosenberg et al. ........... | 705/26 |
| 6,366,791 B1 * | 4/2002 | Lin et al. .................... | 455/567 |
| 6,385,596 B1 * | 5/2002 | Wiser et al. ................. | 705/51 |
| 6,795,711 B1 * | 9/2004 | Sivula ......................... | 455/466 |
| 6,961,714 B1 * | 11/2005 | LeVine ........................ | 705/51 |
| 2001/0040900 A1 * | 11/2001 | Salmi et al. ................. | 370/487 |
| 2002/0058521 A1 * | 5/2002 | Yamada et al. ............. | 455/458 |
| 2002/0087656 A1 * | 7/2002 | Gargiulo et al. ............ | 709/217 |
| 2002/0099798 A1 * | 7/2002 | Fedorovsky et al. ........ | 709/219 |
| 2002/0107802 A1 * | 8/2002 | Philips ......................... | 705/51 |
| 2003/0028870 A1 * | 2/2003 | Weisman et al. ........... | 717/178 |
| 2003/0037028 A1 * | 2/2003 | Akhteruzzaman et al. ..... | 707/1 |
| 2003/0050837 A1 * | 3/2003 | Kim ............................ | 705/14 |
| 2003/0051130 A1 * | 3/2003 | MeLampy et al. .......... | 713/153 |
| 2003/0065802 A1 * | 4/2003 | Vitikainen et al. .......... | 709/231 |
| 2004/0015608 A1 * | 1/2004 | Ellis et al. .................. | 709/246 |

\* cited by examiner

*Primary Examiner*—Jean Gelin
*Assistant Examiner*—Julio Perez
(74) *Attorney, Agent, or Firm*—Alston & Bird LLP (57) ABSTRACT

A system and method for downloading fragmented mobile-station ring tones and multimedia presentations for promotional and entertainment purposes. One or more presentations are defined and stored in an electronic storage medium in communication with a fragmentation processor. Ideally, the fragmentation process involves in the first instance segmentation of the presentation according to a predetermined rule set. Whether segmented or not, upon receipt of a fragment delivery request the fragmentation processor reviews the delivery history with respect to the target mobile station or recipient and selects a previously undelivered fragment. The fragment is formatted according to the requirements of the target and transmitted. Preferably a confirmation of receipt is made following transmission. When a completion notification is received, the fragmentation processor initiates a verification algorithm to confirm the completion and, if valid, alerts the system operator.

35 Claims, 8 Drawing Sheets

FRAGMENTED DELIVERY OF MULTIMEDIA

The present invention relates generally to downloadable ring tones and multimedia presentations for use by mobile stations, and more specifically to a system and method for selectively downloading fragments of a ring tone at various times and in various sequences for promotional or entertainment purposes.

BACKGROUND OF THE INVENTION

Mobile cellular telephones are becoming increasingly popular with an ever-expanding portion of the population. This means not only that such devices are owned and used by more and more subscribers, but that these users are more apt to carry them everywhere. The mobile telephones of only a few years ago were large and bulky, and often required a relatively large battery pack to be carried with them, or, more typically, they were permanently installed in an automobile where a source of reliable power was usually available. Once advances in technology made these mobile devices not only more affordable but more portable, they became a standard piece of equipment for many people to take almost everywhere they go.

As a result, in many group settings such as office-building lobbies, sporting events, shopping centers, and even large offices, the familiar ring of a cellular telephone prompts a multitude of persons to check their own phone to determine if they are the one receiving the publicly—announced incoming call. One way of addressing this cell-phone ubiquity has been for some manufacturers to provide their mobile products with a distinctive ring tone. Note that in this sense, a "ring tone" often includes many and varied tones, the tones sometimes arranged to play a melody. Of course, the more popular a given brand of telephone, the less unique its ring tone becomes. In response, many mobile phones today come programmed with a plurality of available ring tones and ring-tone modifying options (volume, pitch, speed, etc.). A utility is provided for a subscriber's use in customizing the ring tone within, of course, the limits of available options. A subscriber may even be allowed to compose and store an original ring tone.

Often not satisfied with the options available, many subscribers have resorted to installing their own, electronically prerecorded ring tone, provided the mobile phone permits such an operation. While this may be the subscriber's own composition, more often it will have been written and recorded by another expressly for this purpose; the user simply loads it from a storage media or downloads it through the Internet. Suppliers of these extra ring tones typically make them available to properly—equipped subscribers for a nominal (or in some cases significant) fee. ("Properly-equipped" simply means that the subscriber's mobile station is capable of accepting, storing, and playing the desired ring tone.)

Typically, the ring tone is simply loaded and then selected or deselected for use, except that if a particular storage medium gets full, the user may delete an old ring tone in favor of a newly acquired one. In other words, the total utility of the ring tone that is received by the subscriber is as a replacement for the ring tone or tones that were originally available on the phone as it was manufactured and sold. If transmitted to the user in a somewhat different manner, however, the utility of the new ring tone can be extended to provide promotional and entertainment functions as well. The system and method of the present invention provides just such an advantage, an advantage that is adaptable to other types of media presentations as well.

SUMMARY OF THE INVENTION

The present invention is directed to a system and method for delivering fragmented multimedia presentations, for example ring tones or graphic images, to a communication terminal such as a mobile station operating in a wireless communication network. In one aspect, the present invention is a system including a multimedia database for storing the multimedia presentation and a multimedia server for dividing the stored presentation into segments, and for selecting fragments made of up one or more segments and directing that each fragment be transmitted to the intended recipient at an appropriate time. The server may be directly connected to the wireless network, or communicate with it, and possibly with other communication networks as well, through an intermediate network such as the Internet. The fragmented multimedia messages may contain portions of a complete presentation that the recipient collects to win a prize as part of a promotion. In this case, the system may also include an award confirmation function, possible resident on the multimedia server itself, to confirm that a claimant is legitimately a prize winner.

In another aspect, the present invention is a method of delivering fragmented multimedia presentations including the steps of providing a storing a presentation on a multimedia database, segmenting the stored presentation, and, when instructed to do so, transmitting a fragment of the presentation to one or more intended recipients. The fragment is selected according to a predetermined set of rules. The method may further include the steps of recording each transmission on the multimedia database, confirming that a claimant has been sent the entire multimedia presentation, and notifying both the system operator and the recipient that the award has or has not been confirmed. Finally, where an award has been confirmed, the fragment selecting rules may be modified to govern the award of future prizes.

BRIEF DESCRIPTION OF THE DRAWINGS

For a more complete understanding of the present invention, and the advantages thereof, reference is made to the following drawings in the detailed description below.

DETAILED DESCRIPTION

FIGS. 1 through 6, discussed below, and the various embodiments used to describe the present invention are by way of illustration only, and should not be construed to limit the scope of the invention. Those skilled in the art will understand the principles of the present invention may be implemented in many variations, in addition to the methods and networks specifically discussed herein.

The present invention is directed to a method and system for transmitting fragmented multimedia messages, including ring tones, to subscribers of a wireless telecommunications network. A "multimedia message" denotes content transmitted to a receiver that can process the received message to create a presentation having any one or more of, for example, voice, message, audio, text, and graphic components. As used herein, "multimedia" will also refer to a ring tone. In this context, the receiver's presentation of multimedia may use any of its presentation components (display, speaker, ring-tone, generator, LEDs, and so forth), and even those external devices with which it is in communication. These external devices, for example, may be head sets normally designed for use with the receiver. In addition, external devices may be otherwise unrelated components that are close enough to the receiver to participate in the presentation. For one example, a wireless cell phone plays the multimedia presentation to announce a calendar event by sounding a tone and by using the Bluetooth protocol to direct a nearby computer to display a message on its screen and play a melody through its speakers.

A "fragmented" multimedia message results in a presentation of only a portion of the complete or entire multimedia message at one time. The portions are of any size that is more than none and less than all of the presentation. The multiple portions making up the entire presentation may be collected at the receiver, which is capable of executing the portion of the multimedia presentation collected so far. In this context, however, it should be noted that a streaming multimedia presentation (live or recorded) such as a music video or basketball game, that is merely sent and presented in its natural sequence is not in this sense "fragmented". This is true even where the presentation itself is sent in parcels rather than as a complete whole before it is played. Rather, in fragmentation the user will perceive (or at least be informed) that some portion of the entire session is missing from its natural sequence or position.

Figure 1:
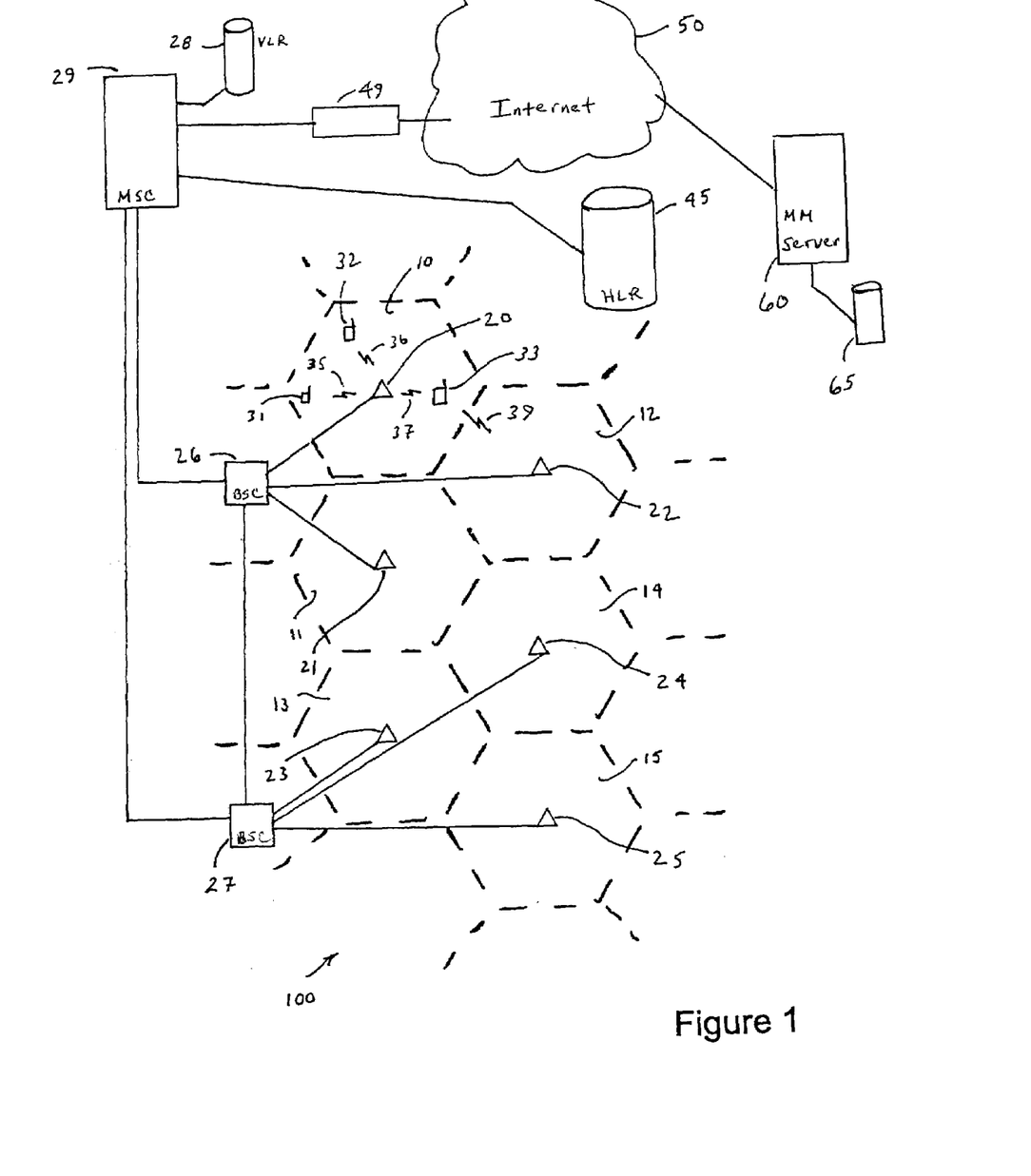
FIG. 1 is a simplified block diagram illustrating selected components of a wireless telecommunication network for transmitting fragmented multimedia messages according to an embodiment of the present invention.

In one embodiment, the present invention may be implemented in transmitting a ring tone or audio-visual presentation to a cellular telephone through a wireless telecommunication network. FIG. 1 is a simplified block diagram illustrating selected components of such a network, sometimes referred to as a public land mobile network (PLMN) 100, according to one embodiment of the present invention. The entire geographic area (not shown in FIG. 1) covered by such a network is divided into a number of cells, such as cells 10 through 15 delineated by broken lines in FIG. 1. Although only six cells are shown, there are typically a great many, and they may vary in size and shape. In the illustrated embodiment, each cell has associated with it a base transceiver station (BTS), for example BTS 20, for transmitting and receiving messages to and from mobile stations (MSs) in cell 10, here MS 31, MS 32, and MS 33, via radio frequency (RF) links 35, 36, and 37, respectively. Mobile stations MS 31 through MS 33 are usually (though not necessarily) mobile, and free to move in and out of cell 10. Radio links 35–37 are established only where necessary for communication. When the need for a particular radio link no longer exists, the associated radio channels are freed for use in other communications. (Certain channels, however, are dedicated for beacon transmissions and are therefore in continuous use.) BTS 21 through BTS 25, located in cell 11 through cell 15, respectively, are similarly equipped to establish radio contact with mobile stations (not shown) in the cells that they cover.

BTS 20, BTS 21, and BTS 22 operate under the direction of a base station controller (BSC) 26, which also manages communication with the remainder of PLMN 100. Similarly, BTS 23, BTS 24, and BTS 25 are controlled by BSC 27. In the PLMN 100 of FIG. 1, BSC 26 and 27 are directly connected and may therefore both communicate and switch calls directly with each other. Not all BSCs in PLMN 100 are so connected, however, and must therefore communicate through a central switch. To this end, BSC 20 is in communication with mobile switching center MSC 29. MSC 29 is operable to route communication traffic throughout PLMN 100 by sending it to other BSCs with which it is in communication, or to another MSC (not shown) of PLMN 100. Where appropriate, MSC 29 may also have the capability to route traffic to other networks, such as the Internet 50. Note that while Internet connections are common, many other networks, including the public-switched telephone network (PSTN), may access the PLMN 100 as well. Data passing from one network to another will typically though not necessarily pass through some type of gateway, which not only provides a connection, but converts the data from one format to another, as appropriate.

To the extent possible, the current cell location of each MS in its coverage area is stored in a visitor location register (VLR), such as VLR 28, a database connected with (or incorporated as a part of) MSC 29. From time to time, this location information may also be sent to the relevant home location register (HLR) 45 for storage. The HLR is associated with the wireless network as a whole (or a significant position of it), and includes relevant data related to each mobile station operated by network subscribers. (Mobile stations not subscribing to the network may be "roaming" or operating outside of their network-coverage area. The locations of these stations may be tracked in a similar manner as long as operation in the area continues.) By keeping track of the serving BTS for mobile stations, of course, PLMN 100 can more efficiently establish a connection to a target mobile station.

In the embodiment of FIG. 1, multimedia server 60 is in communication with PLMN 100 through the Internet 50. There is no requirement that it be connected in this way, of course, and in alternate embodiments (not shown) it may be connected, for example, through a gateway or directly to the PLMN 100 through MSC 29. Multimedia server 60 accesses multimedia content stored on multimedia database 65, and processes it for transmission to mobile stations through PLMN 100, as described more fully below. Multimedia server 60 and database 65 are shown separately for illustration; in reality they may be part of PLMN 100, and may even be installed on existing PLMN components.

Figure 2:
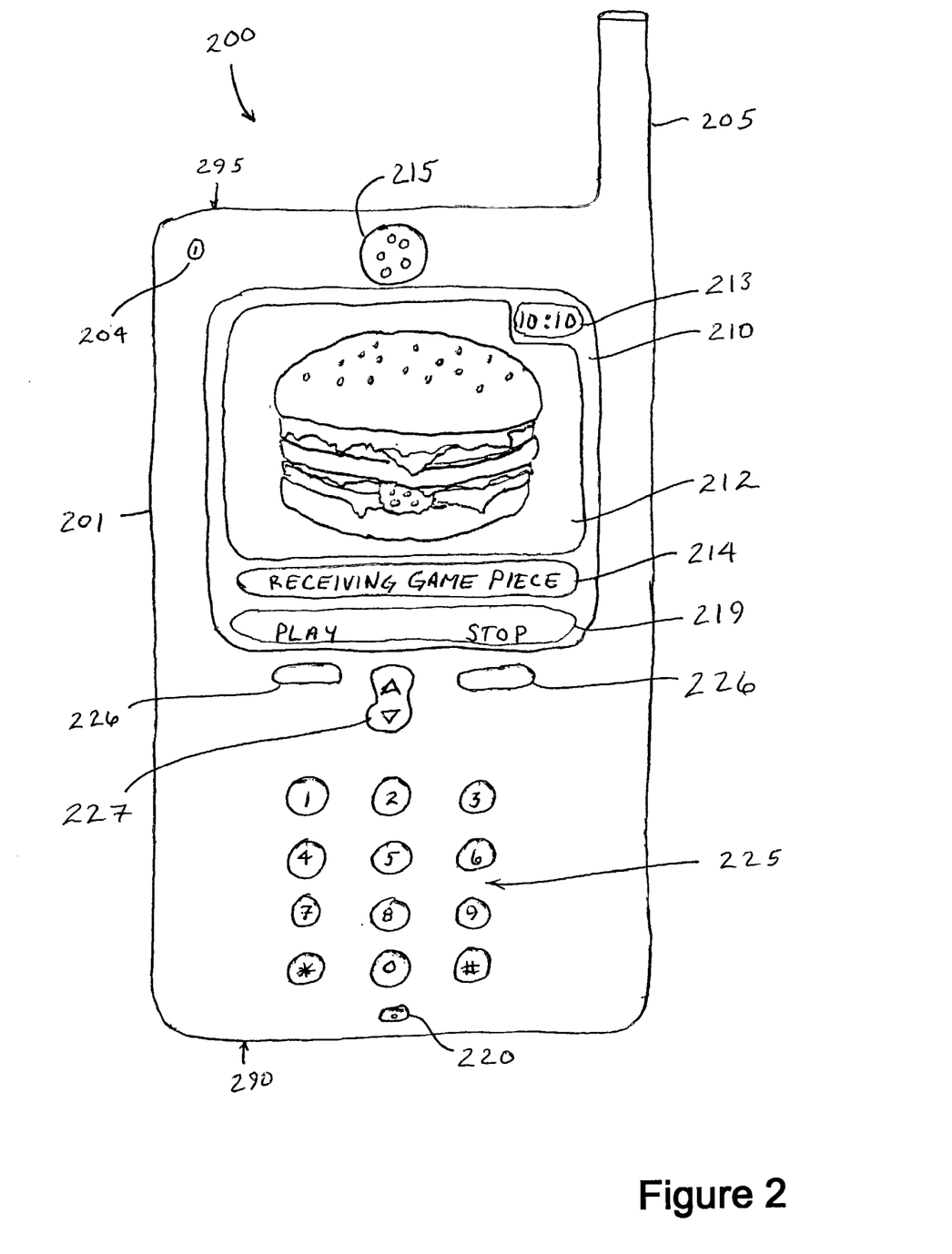
FIG. 2 is an illustration of a mobile station for receiving fragmented multimedia in accordance with an embodiment of the present invention.

FIG. 2 is an illustration of a mobile station 200 for receiving fragmented multimedia in accordance with an embodiment of the present invention. The term "mobile station" (and the initials "MS") is used generally to indicate a communications terminal capable of receiving the multimedia message transmitted from the multimedia server 60 (shown in FIG. 1). Note that in a preferred embodiment, the transmitted multimedia message can be tailored to match the capabilities of the target MS, assuming they are known or ascertainable. Note that some modifications to many currently operating mobile stations may be necessary to enable them to receive and use fragmented multimedia messages according to the present invention. Mobile station 200 shown in FIG. 2 includes a power switch 204 for turning the unit on and off, and an antenna 205 for facilitating radio frequency (RF) communication with the PLMN 100 (shown in FIG. 1). The liquid-crystal display (LCD) 210 of mobile station 200 is large enough to permit the display of graphic images and pictures, as opposed to just the letters and numbers associated with older-style mobile telephones. The other user interfaces present include speaker port 215, a set of openings formed near the top 295 of the enclosure 201 of mobile station 200, adjacent to an internal speaker (not shown). Audio input is accomplished through microphone port 220 located near the bottom 290 of mobile station 200. The user may enter alphanumeric information on the alphanumeric keypad 225, and is presented with a number of other user interface devices such as function keys 226 and scroll key 227.

In the embodiment of FIG. 2, display 210 is divided into two or more different regions. In practice, these divisions may be real, physical divisions involving separate display units, or they may be created on a single display screen that is logically divided. Image region 212 is the part of the display 210 that is used for graphics and illustrations, such as when a Web page has been downloaded or a multimedia presentation is being played. Currently displayed in image region 212 is a picture of a hamburger, which may be part of a promotion sponsored by a restaurant chain. A clock 213 in the upper-right hand corner of display 210 displays the current time, which is may do continuously or as requested. When not requested, clock 213 may simply disappear and image region 212 enlarged to include this portion of display 210 as well. Call status region 214 of display 210 displays information related to in-progress communications (or the lack thereof). This may be an indication that the mobile station is retrieving a Web page, or simply an indication that a voice call is "waiting" or on hold. The indications may be programmed and selected only by the MS 200 itself, or in the alternative may be transmitted or designated through the PLMN 100, and so subject to much more customization. Finally, function indicator region 219 indicates the respective current functions that function keys 226 are ready to perform when activated by the user.

Figure 3:
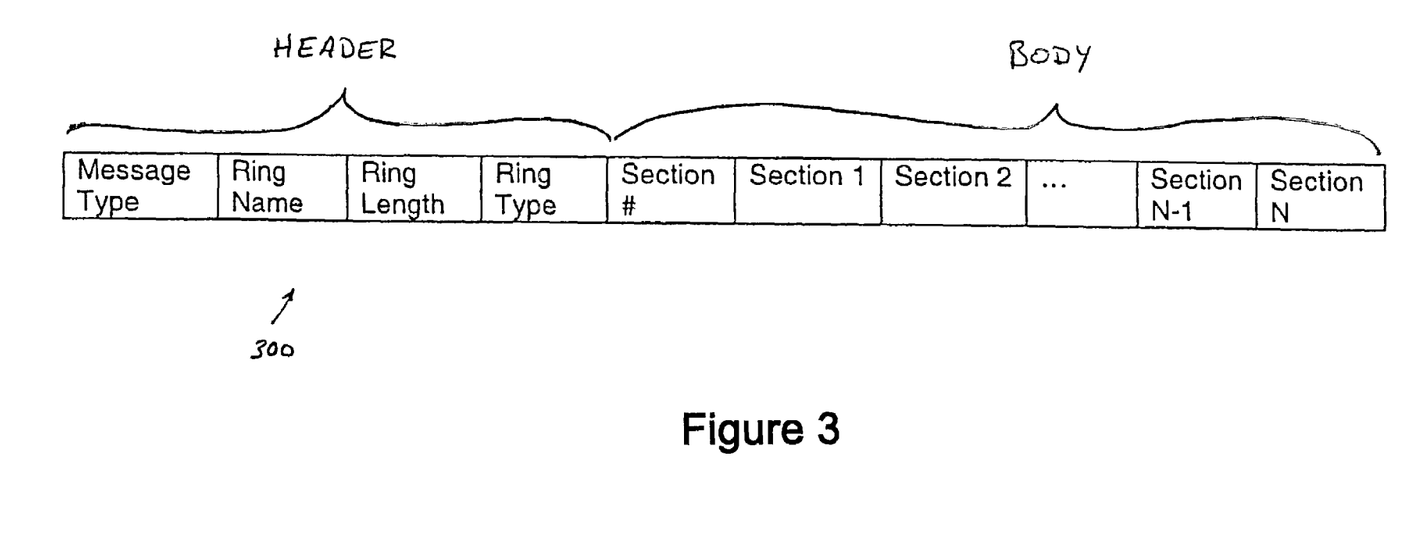
FIG. 3 illustrates a preferred format for transmitting the fragmented message from a multimedia server to a mobile station via the Internet and a PLMN, according to an embodiment of the present invention.

In order to create a presentation on MS 200, multimedia server 60 transmits one or more messages, each message containing one or more fragments. (Note that a single message may contain the entire message in fragmented form, each fragment to be activated or revealed at an appropriate time. FIG. 3 illustrates a preferred format for transmitting the fragmented message 300 from multimedia server 60 to MS 200 via Internet 50 and PLMN 100, according to an embodiment of the present invention. In this embodiment, the message is intended to produce a ring tone. As shown in FIG. 3, message 300 includes a HEADER and a BODY. The HEADER contains four fields: MSG_TYPE, RING_NAME, RING_LENGTH, and RING_TYPE. The field MSG_TYPE contains a value indicating that the following message is a ring-tone sequence, and may indicate it is one of several available subtypes of such message. The RING_NAME field contains an identifying label for the ring-tone sequence being transmitted, and, if different, a name to be displayed on the display 210 of the mobile station 200 when appropriate. The RING_LENGTH indicates the length of the ring-tone sequence. Note that this length is distinguishable from the length of the message itself (for example, in bits). It may indicate, however, how many tones are included in the ring sequence, the length of each such tone, and any intervening spaces, or the total playing time. This field in part enables the creation of the display shown in FIG. 4.

Following the HEADER is the BODY of message 300. The BODY begins with the SECTION_NO field, which indicates which one (or more) of all the sections (fragments) is being downloaded. While this also facilitates the proper creation of the display, it more importantly indicates the order in which it should be played as the ring sequence is executed. If the ring sequence is to be transmitted one fragment at a time, the message may simply terminate after the SECTION_1 field, which may or may not be followed by an END_MSG field (not shown). In the illustrated embodiment, however, multiple fragments of the ring sequence are transmitted. After the SECTION_1 field, the SECTION_2 field follows, and so on. (Although there is no specific requirement that the ring sequence sections be transmitted in order.) The field SECTION_N–1 in FIG. 3 indicates the pendultament section and SECTION_N the final. This last field also possibly is followed by an END_MSG field (not shown), although if the number transmitted sections is indicated by the RING_LENGTH field or the SECTION_NO field, of course, no end-of-message indicator will be necessary. Note that while the format shown is preferred other formats may work equally as well.

When, as described above, the multimedia presentation is a ring tone, it may be delivered (or activated) one or more fragments at a time so that the user is able to play a partial ring tone. Preferably, although not necessarily, the alert sequence will be recognizable or contain recognizable elements such that the subscriber perceives it is not entire but realizes what is needed to complete the sequence. An example of this would be a well-known theme song or jingle. Or, a predictable tune or melody could be used such that even where the user is not familiar with the sequence (here referring to the tune or melody), by intuition, the missing portions are mentally anticipated. In an alternate embodiment, the user will be able to anticipate the missing portions of the sequence only with difficulty, or not at all. A misdirection may even be employed, to make the user believe that the sequence will be completed in one way when it in fact is intended to be completed in another.

Figure 4:
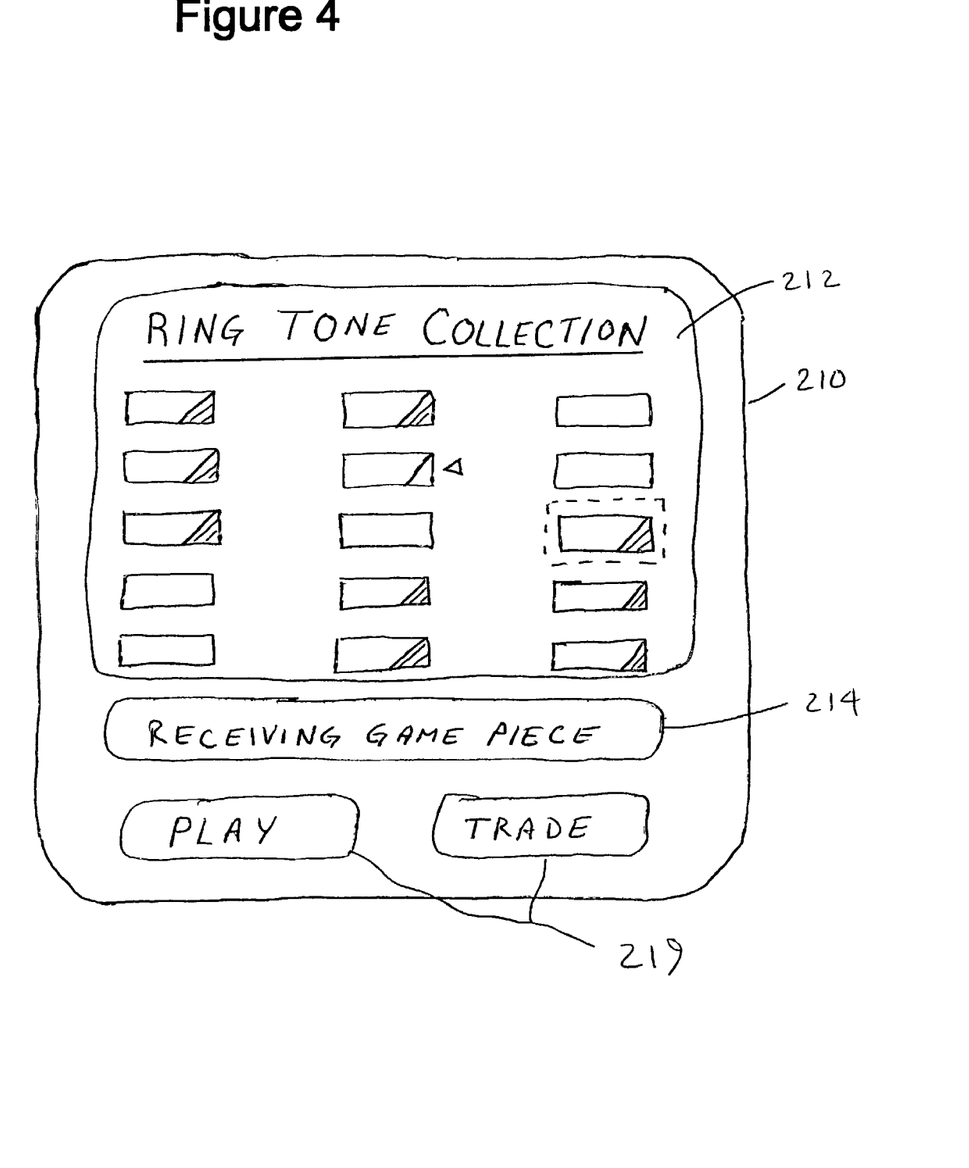
FIG. 4 is an illustration of the display of the mobile station shown in FIG. 2, this time displaying a ring-tone collection status graphic according to an embodiment of the present invention.

FIG. 4 is an illustration of the display 210 of MS 200 shown in FIG. 2, but this time displaying a ring-tone collection status graphic according to an embodiment of the present invention. The status graphic itself fills the image region 212 of display 210, and is one of many ways the relevant information may be displayed. The ring tone may be one of many that the user of MS 200 is 'collecting', and may or may not yet be in actual use, perhaps depending on its level of completion. The ring tone of FIG. 4 appears to have been divided into fifteen fragments, nine of which have been received, as indicated by shading in the lower right-hand corner of the rectangle representing each received fragment. Unreceived fragments are represented by empty rectangles. The rectangles may be in order, so that the subscriber may determine which portions are still needed to make the presentation entire. A message in call status region 214 of display 210 announces that a new fragment is currently being received, and the partially received fragment is indicated by a small triangle (appearing near the middle of the status graphic). In FIG. 4 one of the (received) fragments has been selected for some purpose as indicted by the broken line surrounding its representative rectangle. Typically, any one of the fragments may be selected, perhaps by manipulating scroll key 227 (shown in FIG. 1), to be played or, if permitted, traded with another subscriber. The labels displayed in function indicator region 219 reveal that activating one of the function keys 226 (also shown in FIG. 1) will perform one of these operations.

Note that the display 210 may also be display other information relevant to the delivery of fragmented multimedia messages. For example, where multiple ring tones are being collected by the MS 200, a play list could be stored and, upon command, displayed on display 210 so that the subscriber may select one for use (or listening, deletion, and so forth). For another example, according to one embodiment of the present invention ring tones expire, that is, are automatically erased after a certain time period following completion. Alternately, they could be erased if not collected rapidly enough or within a certain time period. In either case, expiration data could also be displayed to alert the user, perhaps prompting them to collect more quickly.

The alert sequence does not have to be limited to ring tones, of course, and may include other sounds or vibration alert portions if the mobile station is capable of performing them. In one particularly preferred embodiment, a determination of the mobile station's capabilities are made at some point and the multimedia sequence to be transmitted is adjusted accordingly. Moreover, the use of the ring tone or other multimedia presentation as an alert sequence is only a preferred embodiment. It may be intended for other uses, or simply for the enjoyment of the subscriber. One application of the method of the present invention provides an entertaining way for product or service promotion. In one embodiment, the fragmented multimedia sequence is a game or contest in which a prize may be awarded upon successfully completing the entire sequence. As with many such contests, similar fragments, or "pieces" may be sent out gratuitously with others sent out very judiciously. Subscribers would presumably figure out which sections were missing and hope to gain them. Obtaining portions of the sequence could be executed in a number of ways. Naturally, as the subscriber simply needs to have the mobile station on in order to receive multimedia messages, the sequence could be sent randomly. The collecting aspect of the promotion could be supplemented with advertisements sent automatically to a MS, perhaps to encourage the user to participate in activities that will result in the transmission of more fragments (such as buying hamburgers).

In other words, the ring tone heard by the subscriber when receiving a call would be a portion of the ring sequence, a portion of the ring sequence that they had already earned or been awarded. Alternately, the ring tone may be associated with receiving a message or page. It could simply be stored to be returned and played on command. The command may follow some form of prompt such as a vibration or tone alert or a SMS message indicating that a new portion of the ring tone is available.

The value of such a promotion would actually increase as more and more subscribers become involved in their ring tones—at whatever stage of completion—heard by nearby subscribers. In one embodiment, subscribers are even allowed to trade portions of the ring tone that they hear on someone else's telephone, assuming the other party is also willing to trade. Such trades may require connecting to the network, perhaps performed in a phone call between the parties, or may be executed by connecting the mobile stations together directly in some way.

Figure 5A:
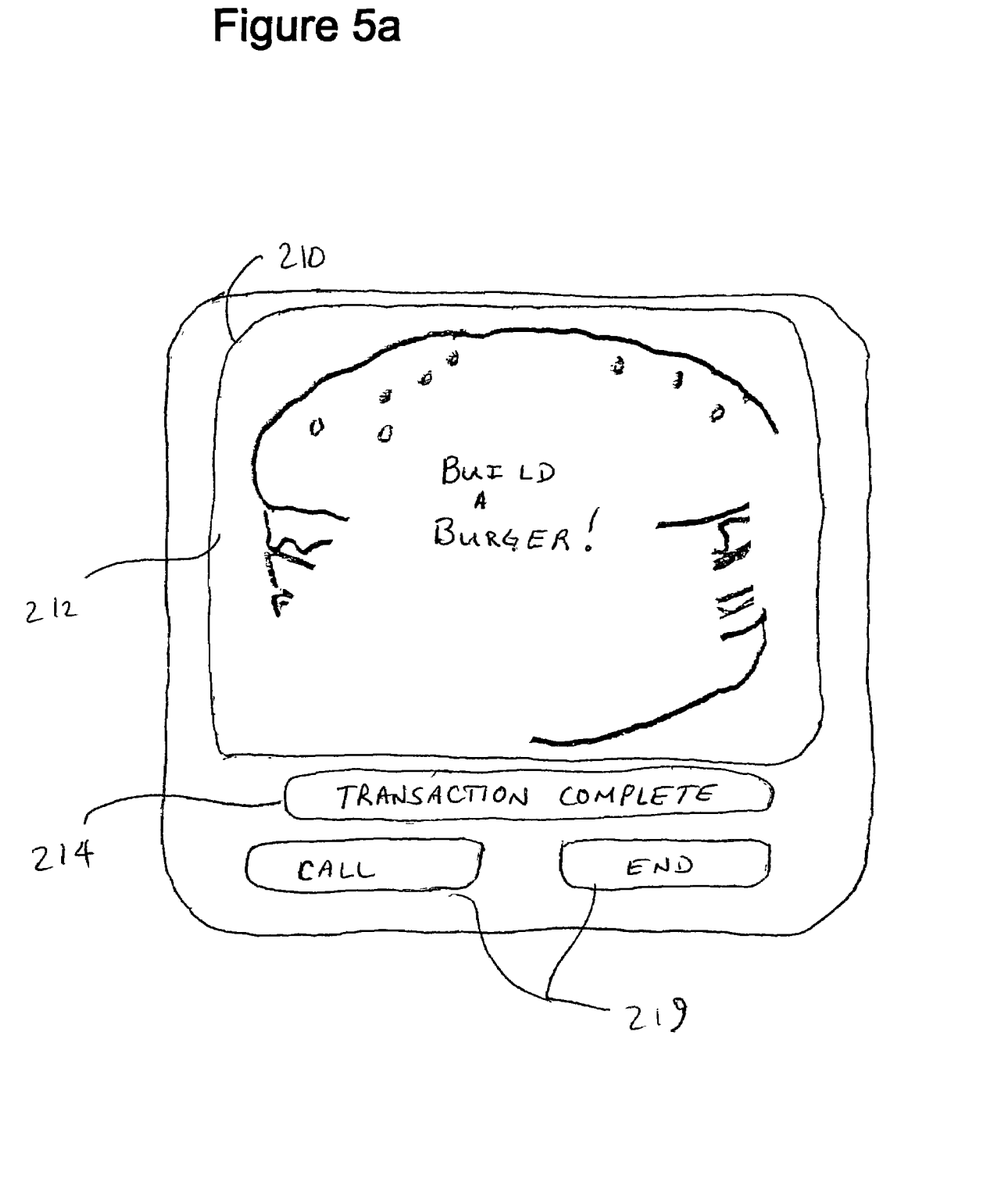
FIGS. 5a through 5c illustrate the use of a graphic image that may be collected by the user as part of a promotion according to an embodiment of the present invention.
Figure 5B:
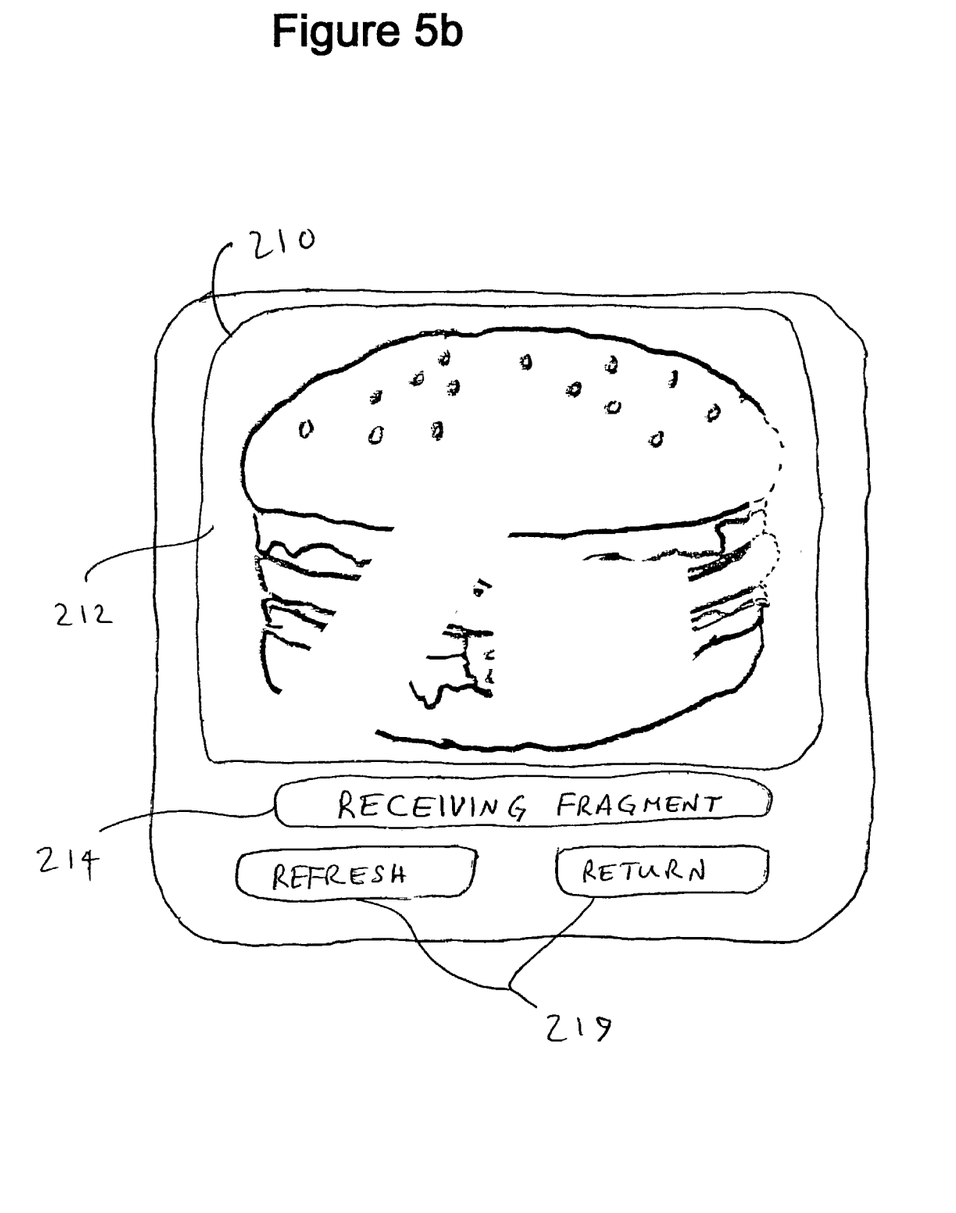
Figure 5C:
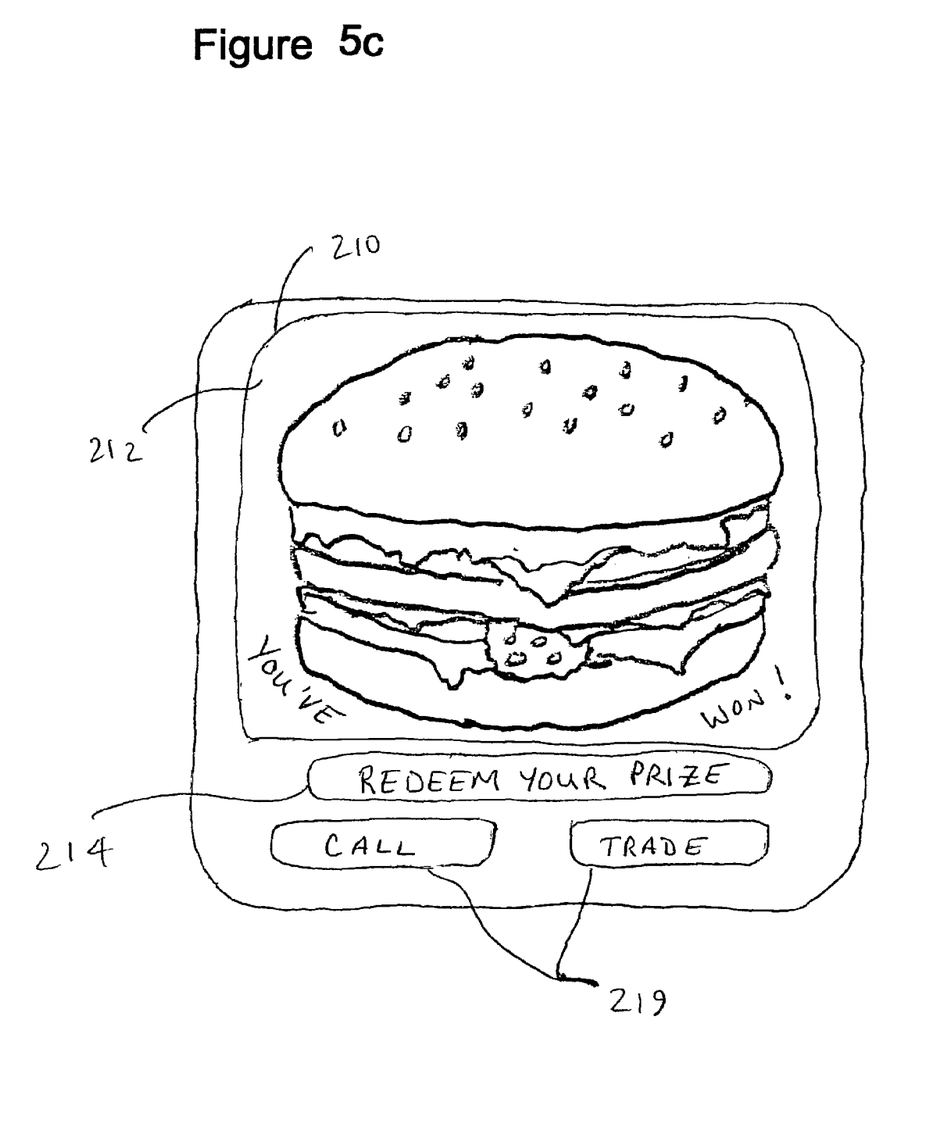

FIGS. 5a through 5c illustrate the use of a graphic image that may be collected by the user as part of a promotion according to an embodiment of the present invention. The image may constitute the entire presentation or may accompany a ring tone collection or include other multimedia effects. In the embodiment of FIGS. 5a through 5c, the promotion consists at least of assembling, fragment by fragment, the hamburger displayed on the MS of FIG. 2. Note that in an alternate embodiment, the received image may be displayed in several locations or on other types of communication terminals, for example a personal computer that uses a wireless LAN connection while at the restaurant running the promotion. In FIG. 5a, the user has just begun to collect the image. Again, the multimedia presentation, here a graphic image, may have been transmitted entirely and stored, but all activation codes or signals have not been received. Not that the graphic contains a message composed of 'substitute fragments', transmitted initially to take the place of the missing pieces and give the recipient some idea of the object of the promotion. A status graphic similar to that of FIG. 4 could also be used in connection with the graphic image, and the graphic image could be supplemented with a shadow image or outline for much the same purpose. The status region 214 of display 210 indicates that a transaction has been completed; either the receipt of the multimedia message itself, or perhaps a purchase at the restaurant using MS 200 that initiated the collecting process.

Turning to FIG. 5b, the user has now been awarded additional fragments, and one is in the process of being received—as indicated by the message in status region 214 and the broken line on the right side of the displayed graphic. In an alternate embodiment (not shown) the graphic pieces are 'scrambled' to make a determination of the graphic image's final configuration, and not unscrambled until all or most of the fragments have been received. In FIG. 5c, the picture has been completed and is being displayed. A message in status region 214 indicates that whatever prize is being offered is now available, and function indicator region 219 provides the subscriber with options for immediate execution. Note that in the embodiment of FIGS. 5a through 5c, the messages appearing in status region 214 and function indicator region 219 have a close connection to the promotion and the state the collected multimedia presentation is in. In a preferred embodiment these messages are transmitted in conjunction with the multimedia message itself. Alternately, they would simply display generic mobile station function, perhaps with a separately accessible menu providing options for the subscriber to execute.

Figure 6:
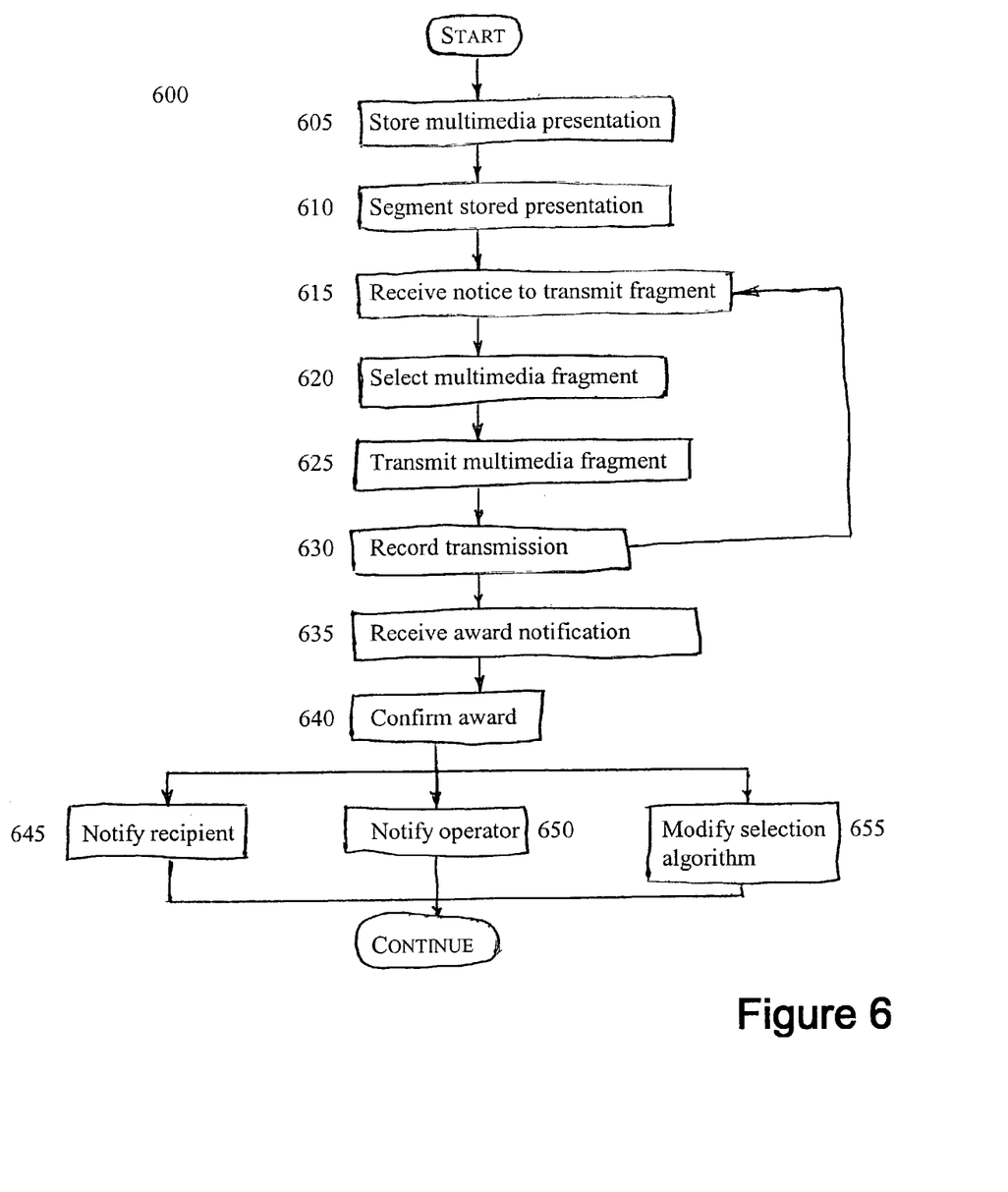
FIG. 6 is a flow diagram illustrating a method for sending a fragmented multimedia message, such as a ring tone, in accordance with an embodiment of the present invention.

FIG. 6 is a flow diagram illustrating a method 600 for sending a fragmented multimedia message, such as a ring tone, in accordance with an embodiment of the present invention. Initially, note that there are several strategies for sending the fragmented ring-sequence to the mobile station 200. In one embodiment, the sections or fragments of the complete message are transmitted one at a time. In this embodiment, it is preferred that the first transmission of a ring-sequence fragment is sufficient in length to constitute a viable incoming-call (or other) alert. Alternately, the subscriber may be presented with the option to use the ring-sequence as it is or to continue using a previous sequence until such time as a satisfactory alert is attained. To make up for missing fragments when few have so far been received, a plan or generic tone may be substituted for some or all of the missing sequence until a more complete form of the ring sequence has been assembled. Again, use of the generic filler fragments may be left up to the subscriber option. Similar strategies may be used for graphic images and other multimedia.

In an alternate embodiment, instead of sending the ring-sequence fragment itself, transmitted to the mobile station is a password or code representing either a ring-sequence segment, or alternately representing the ring sequence as it may be constructed from the fragments already awarded to the mobile station. Upon receipt of these codes or passwords, the mobile station user may request transmission of the sequence so that it can be reviewed, stored, or adopted.

In yet another embodiment, the entire multimedia presentation is transmitted to the mobile station 200 in encoded form. As each fragment is awarded, a decoding sequence is sent so that the mobile station is able to use the awarded segment. This embodiment may also be useful where specific activities of the subscriber (such as the purchasing of a product or completion of a task) result in the award of fragments. When properly formulated, the encoded messages then require no further contact with the server to award segments.

In one embodiment, the multimedia server 60 also includes an award confirmation function. Database 65 stores information related to segments that have been awarded to individual mobile stations. In an alternate embodiment, these functions are performed by separate components. While in some embodiments it may be sufficient to allow individual mobile stations to track award data, in games, promotions, or contests where the significance of a successful collection may encourage fraud, the maintenance of a central database may be indispensable. As in the preferred embodiment all ring-sequences are numbered, it will be apparent that keeping track in the database of awarded sequence fragments can be easily accomplished. The database is therefore available to provide verification of the award of a complete sequence.

Returning to FIG. 6, at START it is assumed that the rules of the promotion or other purpose have been established and the necessary equipment has been installed or modified to perform the necessary functions. First, a multimedia presentation is stored on multimedia database 65 (step 605). In a preferred embodiment, the stored presentation is then segmented (step 610). In this context, note that as used herein, the terms "fragmenting" and "segmenting" have different meanings. The distinction is made for the purposes of clarity in this disclosure, and may not be common throughout the art or industry. As used herein, a "fragment" is the portion of a multimedia presentation or ring tone that is somehow sent, authorized, or otherwise available to a subscriber. In other words, a fragment is simply a portion of the entire message. While strictly speaking, the fragment may be nearly all of the entire message, when used in such a way the idea of fragmentation presents no advantage over the existing method of distributing these media. Fragments may more advantageously be created by dividing the entire media presentation into equal portions, either according to the duration of the presentation, or using an electronic storage measure (number of stored bytes, for example). It may also be accomplished by dividing the media presentation up into fragments of randomly differing size, or according to some predetermined algorithm.

On the other hand, "segment" describes a portion of the entire media presentation that the fragmenting operation will consider indivisible. Segmentation (step 610) therefore occurs before a media presentation is fragmented in order to send a fragment to the subscriber. Segmentation, when used in this sense, may be accomplished simply by isolating notes or tones of the same pitch, so that an incomplete note or tone is not sent at either end of a fragment. Segments may even be less than a full note or tone in size, and merely divide up the entire presentation into discrete quantities, such that a particular portion of the entire presentation can be accounted for, that is, as "sent" or "not sent". For example, if an entire media presentation is divided up into 2,056 segments, they may be each be assigned an identity number when, in the course of the extracting a portion of the media presentation, individual segments, which will be of some finite size, will not be divided when they appear at the end of a fragment.

In addition, the segments may be used by a fragmenting algorithm in order to ensure that the fragments are of equal, or alternately of unequal size. Finally, the segment identities may each be accounted for so that the fragmentation server may track who has received each individual segment, thereby avoiding repetition. Segments may, of course, be much longer as well, and may be used to divide the media presentation into portions that the sender does not wish to be divided, even though the subscriber is getting only a portion of the entire media presentation. (Alternately, it should be apparent, segments and sub-segments may be used such that a segment would be made up of a predetermined number of individually defined sub-segments.) In this way, the owner of a well-known jingle may be assured that the received portion of the fragmented ring tone will still be somewhat recognizable. Note that in accordance with the present invention, however, segmentation is not required nor is there any requirement that the same portion of the entire media presentation not be sent multiple times.

Returning to FIG. 6, eventually the multimedia server 60 receives notice (step 615) that a fragment should be transmitted, including contact information for the intended recipient. At this time server 60 selects a fragment (step 620). Fragments may be selected randomly or according to a predefined pattern or set of selection rules. The selection process will vary significantly depending on the purpose for which the multimedia message is being sent, in this way the collection process may be biased in favor of rapid or slow completion, and may allow only a single 'winner' to collect the entire presentation. Key fragments may also be withheld until a certain amount of time has passed, or a certain event has taken place, to ensure the promotion does not end too abruptly. The selection rules may or may not permit the same fragment to be sent twice to the same recipient.

Once selected, the fragment is transmitted (step 620), preferably using the message format illustrated in FIG. 3. Assuming fragment tracking is desired, a record of the fragment, identified by its constituent segments, and the recipient is then stored in multimedia database 65 (step 630). The server 60 then simply waits for another notice o be received (step 615), and the process is repeated from that point. Eventually, however, the server receives a completion notice (step 635), indicating that someone has received the complete presentation. When this occurs, the server 60 activates an award confirmation function that compares the identity of the winner to the records in multimedia database 65 to make sure that a spurious or fraudulent notice was not generated. Note that recording each transmission is not the only way to determine authenticity. The fragmented multimedia messages might also include values that can be combined into a checksum or key to be transmitted by the mobile station to the multimedia server for confirmation along with a notice that all pieces have been received. The recipient is then notified (step 645) that the award has (or has not) been confirmed, and may be given instructions on how to proceed. At this point the system operator is also notified of the confirmation result (step 650), and, where applicable, the fragment selection algorithm is modified to ensure that a unique prize is not awarded more than once. In an alternate embodiment (not shown) the system operator is simply notified when a complete multimedia presentation has been transmitted, and the recipient is contacted by other means. Note that not all multimedia presentations will be used for large-scale promotions, and the steps of the above-described method may be omitted, rearranged, or amended accordingly.

The preceding descriptions are of preferred examples for implementing the invention, in order to make its practice and application clear to one of ordinary skill in the art. The scope of the invention, however, should not necessarily be limited by this description. Rather, the scope of the present invention is defined by the following claims.

What is claimed is:

1. A method of delivering fragmented media presentations to a mobile station in communication with a wireless communication network, said method comprising the steps of:
   defining a media presentation;
   storing the media presentation in an electronic storage device;
   receiving a presentation fragment delivery request;
   selecting a presentation fragment, the presentation fragment including a portion of the media presentation; and
   maintaining a log of presentation fragments that have been transmitted to the mobile station,
   wherein at least one presentation fragment comprises data identifying a plurality of presentation fragments that comprise the media presentation and specifying a length and sequence order of each of the plurality of presentation fragments.

2. The method of claim 1, wherein the media presentation is a multimedia presentation.

3. The method of claim 1, wherein the wireless communication network is capable of transmitting in any one or more of a variety of formats, and further comprising the steps of:
   determining a format acceptable to the mobile station; and
   formatting the selected presentation fragment.

4. The method of claim 1, further comprising the step of transmitting the presentation fragment.

5. The method of claim 4, further comprising the step of confirming that the mobile station has received the presentation fragment.

6. The method of claim 4, further comprising the step of receiving a completion notice indicating that substantially the entire media presentation has been transmitted to the mobile station.

7. The method of claim 6, further comprising the step of verifying the accuracy of the completion notice.

8. The method of claim 1, further comprising the step of segmenting the defined media presentation prior to the step of selecting a presentation fragment to generate segments.

9. The method of claim 8, wherein the segments defined in the segmenting step are of a substantially uniform size.

10. The method of claim 8, wherein the segmenting step is performed automatically.

11. The method of claim 8, wherein the selected presentation fragment is one segment in length.

12. The method of claim 8, wherein a number of the segments selected for inclusion in the presentation fragment in the selecting step is determined according to a predefined rule.

13. A system for transmitting fragmented media presentations to mobile stations via a wireless communication network, said system comprising:
   a database for storing in electronic form one or more media presentations;
   a fragmentation server in communication with the database and with the wireless communication network, said fragmentation server comprising:
      a fragmentation module for selecting a presentation fragment, the presentation fragment comprising a portion of the stored one or more media presentations for transmission;
      a communication module for handing communications to and from the fragmentation server;
      a logging module for maintaining a log of presentation fragments that have been transmitted to the mobile station; and
      a processor for directing the operation of the fragmentation module and the communications module,
      wherein at least one presentation fragment comprises data identifying a plurality of presentation fragments that comprise at least one media presentation and specifying a length and sequence order of each of the plurality of presentation fragments.

14. The system of claim 13, wherein the fragmentation server further comprises a segmentation module for segmenting the media presentation prior to fragmentation.

15. The system of claim 13, wherein the fragmentation server further includes a formatter for formatting the presentation fragments prior to transmission to the mobile station.

16. A fragmentation server for fragmenting a media presentation, said fragmentation server comprising:
   a fragmentation module;
   a segmentation module;
   a logging module; and
   a communication module;
   wherein the segmentation module divides the media presentation into a number of discrete segments, the fragmentation module selects a number of the discrete segments to form a presentation fragment, the communication module transmits the presentation fragment, and the logging module maintains a log of presentation fragments that have been transmitted,
   wherein at least one presentation fragment comprises data identifying a plurality of presentation fragments that comprise the media presentation and specifying a length and sequence order of each of the plurality of presentation fragments.

17. The fragmentation server of claim 16, further comprising a verification module for verifying that substantially an entire media presentation has been transmitted to a mobile station.

18. The fragmentation server of claim 16, further comprising a security module for verifying that a media presentation received by the mobile station and retransmitted back to the fragmentation server is authentic.

19. The fragmentation server of claim 16, wherein the media presentation is a ring tone.

20. The method according to claim 1, wherein selecting a presentation fragment comprises randomly selecting the presentation fragment.

21. The method according to claim 1, further comprising transmitting the plurality of fragmented presentations that comprise the entire media presentation.

22. The method according to claim 21, further comprising awarding either one of a gift or a prize to a user of the mobile station when the plurality of fragmented presentations are received at the mobile station.

23. The method according to claim 1, further comprising receiving an identification from the mobile station of which presentation fragments, if any, have not been received by the mobile station.

24. The method according to claim 22, further comprising:

receiving a notice that each of the plurality of presentation fragments has been received by the mobile station;

comparing the identity of the user with stored information specifying whether the mobile station of the user received each of the plurality of presentation fragments;

verifying that the notice was not fraudulently generated; and ensuring that the prize is only awarded once.

25. The method according to claim 1, wherein each of the plurality of presentation fragments comprises a portion of a game and wherein at least one of the presentation fragments among the plurality of presentation fragments comprises information pertaining to either one of a promotion or an advertisement of a business.

26. The system of claim 13, wherein the fragmentation module randomly selects the presentation fragment.

27. The system of claim 14, wherein the communication module transmits the plurality of fragmented presentations to the mobile station during a predetermined time, and wherein the plurality of fragmented presentations comprises the entire media presentation of the at least one of the one or more media presentations.

28. The system of claim 13, wherein, the fragmentation server tracks information regarding which presentation fragments are sent to the mobile station, wherein the logging module stores the information and transmits an award confirmation notice to the mobile station specifying that the user of the mobile station will be awarded either one of a gift or prize when the plurality of fragmented presentations are received at the mobile station.

29. The system of claim 13, wherein the logging module receives an identification from the mobile station of which presentation fragments, if any, have not been received by the mobile station.

30. The system of claim 13, wherein each of the plurality of presentation fragments comprises a portion of a game and wherein at least one of the presentation fragments among the plurality of presentation fragments comprises information pertaining to either one of a promotion or an advertisement of a business.

31. The fragmentation server of claim 16, wherein the fragmentation module randomly selects the presentation fragment.

32. The fragmentation server of claim 16, wherein the communication module transmits the plurality of fragmented presentations that comprise the entire media presentation.

33. The fragmentation server of claim 16, wherein the security module transmits an award confirmation notice to the mobile station specifying that a user of the mobile station will be awarded either one of a gift or prize when the plurality of fragmented presentations are received at the mobile station.

34. The fragmentation server of claim 16, wherein the logging module receives an identification from the mobile station of which presentation fragments, if any, have not been received by the mobile station.

35. The fragmentation server of claim 16, wherein each of the plurality of presentation fragments comprises a portion of a game and wherein at least one of the presentation fragments among the plurality of presentation fragments comprises information pertaining to either one of a promotion or an advertisement of a business.

* * * * *

UNITED STATES PATENT AND TRADEMARK OFFICE
CERTIFICATE OF CORRECTION

| | |
|---|---|
| PATENT NO. | : 7,200,388 B2 |
| APPLICATION NO. | : 10/160364 |
| DATED | : April 3, 2007 |
| INVENTOR(S) | : Deeds |

It is certified that error appears in the above-identified patent and that said Letters Patent is hereby corrected as shown below:

Column 12,

Line 5, "handing" should read --handling--.

Signed and Sealed this

Thirty-first Day of July, 2007

JON W. DUDAS
*Director of the United States Patent and Trademark Office*